(12) United States Patent
Abe et al.

(10) Patent No.: US 10,821,910 B2
(45) Date of Patent: Nov. 3, 2020

(54) WORK VEHICLE

(71) Applicant: KOMATSU LTD., Tokyo (JP)

(72) Inventors: Hiroshi Abe, Tokyo (JP); Yoshiaki Honma, Tokyo (JP); Takeshi Ikeda, Tokyo (JP); Kazuhiro Murata, Tokyo (JP)

(73) Assignee: KOMATSU LTD., Tokyo (JP)

(*) Notice: Subject to any disclaimer, the term of this patent is extended or adjusted under 35 U.S.C. 154(b) by 326 days.

(21) Appl. No.: 15/757,110

(22) PCT Filed: Mar. 31, 2017

(86) PCT No.: PCT/JP2017/013570
§ 371 (c)(1),
(2) Date: Mar. 2, 2018

(87) PCT Pub. No.: WO2018/179322
PCT Pub. Date: Oct. 4, 2018

(65) Prior Publication Data
US 2019/0077333 A1  Mar. 14, 2019

(51) Int. Cl.
| | | |
|---|---|---|
| *B60R 11/04* | (2006.01) | |
| *E02F 9/26* | (2006.01) | |
| *E02F 9/16* | (2006.01) | |
| *H04N 7/18* | (2006.01) | |
| *E02F 9/08* | (2006.01) | |

(52) U.S. Cl.
CPC ............ *B60R 11/04* (2013.01); *E02F 9/0858* (2013.01); *E02F 9/16* (2013.01); *E02F 9/163* (2013.01); *E02F 9/261* (2013.01); *H04N 7/181* (2013.01)

(58) Field of Classification Search
CPC ..... B60R 11/04; B60R 1/00; B60R 2300/105; B60R 2011/004; H04N 7/18; E02F 9/16; E02F 9/261
See application file for complete search history.

(56) References Cited

U.S. PATENT DOCUMENTS

| | | | | |
|---|---|---|---|---|
| 2009/0079839 A1* | 3/2009 | Fischer | ................... | G01S 17/86 348/218.1 |
| 2016/0312438 A1 | 10/2016 | Kotaki et al. | | |
| 2017/0107698 A1 | 4/2017 | Yamaguchi et al. | | |

FOREIGN PATENT DOCUMENTS

| | | |
|---|---|---|
| JP | H05-84515 U | 11/1993 |
| JP | H08-328570 A | 12/1996 |
| JP | H11-239288 A | 8/1999 |
| JP | 2002-327571 A | 11/2002 |
| JP | 2010-60344 A | 3/2010 |
| JP | 2012-233353 A | 11/2012 |
| JP | 2014-215039 A | 11/2014 |
| JP | 2016-98626 A | 5/2016 |
| JP | 2016-113142 A | 6/2016 |
| WO | WO-2016/013691 A1 | 1/2016 |
| WO | WO-2016/038925 A1 | 3/2016 |
| WO | WO-2016/043344 A1 | 3/2016 |

* cited by examiner

*Primary Examiner* — Obafemi O Sosanya
(74) *Attorney, Agent, or Firm* — Faegre Drinker Biddle & Reath LLP

(57) ABSTRACT

A hydraulic excavator has a first stereo camera and a second stereo camera. The first stereo camera has an imaging unit and an imaging unit. The second stereo camera has an imaging unit and an imaging unit. A case accommodates imaging unit and imaging unit inside. Case accommodates imaging unit and imaging unit inside. Case and case are attached to the outside of cab.

14 Claims, 11 Drawing Sheets

WORK VEHICLE

TECHNICAL FIELD

The present invention relates to a work vehicle, and in particular, to a work vehicle having a stereo camera.

BACKGROUND ART

A hydraulic excavator having a stereo camera for terrain surveying in a cab is disclosed in Japanese Patent Laying-Open No. 2012-233353 (PTD 1).

CITATION LIST

Patent Document

PTD 1: Japanese Patent Laying-Open No. 2012-233353

SUMMARY OF INVENTION

Technical Problem

Incidentally, in general, a front windshield of a cab of a hydraulic excavator can be opened by sliding the front windshield from the front of the cab to a cab roof side. Thus, the front windshield can be opened and an operation can be performed.

However, if a camera is arranged as in the above-described PTD, the camera prevents the front windshield from being opened.

An object of the present disclosure to provide a work vehicle in which a stereo camera can be attached to a cab and a front windshield of the cab can be opened.

Solution to Problem

A work vehicle according to the present disclosure includes a cab, a first stereo camera, a second stereo camera, a first case, and a second case. The first stereo camera has a first imaging unit and a second imaging unit. The second stereo camera has a third imaging unit and a fourth imaging unit. The first case accommodates the first imaging unit and the third imaging unit inside. The second case accommodates the second imaging unit and the fourth imaging unit inside. The first case and the second case are attached to an outside of the cab.

Advantageous Effects of Invention

With the above-described configuration, according to the present disclosure, it is possible to realize a work vehicle in which a stereo camera can be attached to a cab and a front windshield of the cab can be opened.

BRIEF DESCRIPTION OF DRAWINGS

FIG. 4 is an exploded perspective view showing a configuration of a case 56a shown in FIG. 2 and stored objects in case 56a.

FIG. 6 is a vertical cross-sectional view showing a configuration inside case 56a.

FIG. 7 is a transverse cross-sectional view showing a configuration inside case 56a.

DESCRIPTION OF EMBODIMENTS

Embodiments of the present invention will be described hereinafter with reference to the drawings.

One Embodiment

First, a configuration of a work vehicle according to one embodiment of the present disclosure will be described. Hereinafter, a hydraulic excavator will be described with reference to FIG. 1 as an example of a work vehicle to which an idea of the present invention can be applied. Note that the present invention is applicable to work vehicles such as a crawler dozer, and a wheel loader other than a hydraulic excavator.

In the following description, "upper", "lower", "front", "rear", "left", and "right" are directions with reference to an operator sitting on an operator's seat 8 in a cab 5.

Figure 1:
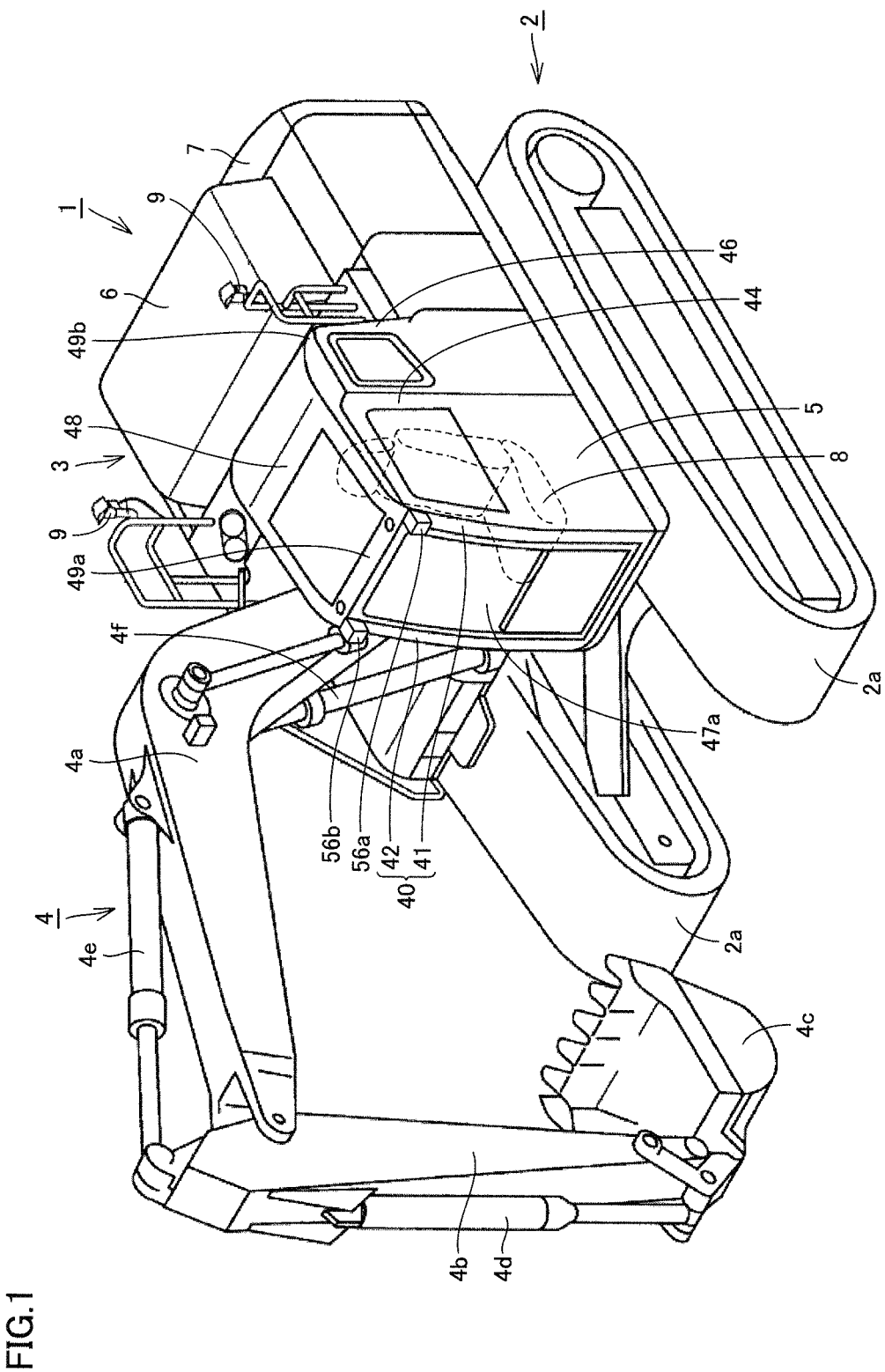
FIG. 1 is a perspective view schematically showing a configuration of a hydraulic excavator according to one embodiment.

FIG. 1 is a perspective view schematically showing a configuration of a hydraulic excavator according to one embodiment. As shown in FIG. 1, a hydraulic excavator 1 according to the present embodiment mainly has a travel unit 2, a revolving unit 3, and a work implement 4. A vehicle body of hydraulic excavator 1 is configured of traveling unit 2 and revolving unit 3.

Travel unit 2 has a pair of right and left crawler belts 2a. Hydraulic excavator 1 can be self-propelled by rotating pair of right and left crawler belts 2a.

Revolving unit 3 is arranged so as to freely pivot with respect to travel unit 2. Revolving unit 3 mainly has cab 5, an engine hood 6, and a counterweight 7.

Cab 5 is arranged, for example, on the front left side (vehicle front side) of revolving unit 3. Operator's seat 8 on which an operator sits is arranged inside cab 5. Antennas 9 are mounted on an upper surface of revolving unit 3.

Antenna 9 is connected to a communication terminal (not shown) of hydraulic excavator 1, and the communication terminal is connected to a controller. The controller is connected to a monitor by a bidirectional communication cable or the like. Antenna 9 can communicate with a communication earth station via a communication satellite outside hydraulic excavator 1, for example.

Each of engine hood 6 and counterweight 7 is arranged on the rear side (vehicle rear side) of revolving unit 3. Engine hood 6 is arranged so as to cover at least the upper part of an engine compartment. An engine unit (an engine, an exhaust gas processing unit, and the like) is stored in the engine compartment. Counterweight 7 is arranged behind the engine compartment so as to balance the vehicle body upon mining or the like.

Work implement 4 is for performing an operation such as excavation of soil. Work implement 4 is attached to the front side of revolving unit 3. Work implement 4 has, for example, a boom 4a, a dipper stick 4b, a bucket 4c, and hydraulic cylinders 4d, 4e, 4f. Boom 4a, dipper stick 4b, and bucket 4c are driven by hydraulic cylinders 4f, 4e, 4d, respectively, and thus work implement 4 can be driven.

A proximal end of boom 4a is connected to revolving unit 3 with a boom pin. Boom 4a is provided rotatably around the boom pin. A proximal end of dipper stick 4b is connected to a distal end of boom 4a with a dipper stick pin. Dipper stick 4b is provided so as to be rotatable around the dipper stick pin. Bucket 4c is connected to a distal end of dipper stick 4b with a bucket pin. Bucket 4c is provided rotatably around the bucket pin.

Work implement 4 is provided, for example, on the right side with respect to cab 5. Note that arrangement of cab 5 and work implement 4 is not limited to the example shown in FIG. 1. For example, cab 5 may be arranged on the front right side of revolving unit 3, and work implement 4 is arranged on the left side of cab 5.

Cab 5 includes a roof portion 48 arranged to cover operator's seat 8 and a plurality of pillars supporting roof portion 48. The plurality of pillars includes front pillars 40, rear pillars 46, and an intermediate pillar 44. Front pillar 40 is arranged at a corner portion of cab 5, in front of operator's seat 8. Rear pillar 46 is arranged at a corner portion of cab 5, behind operator's seat 8. Intermediate pillar 44 is arranged between front pillar 40 and rear pillar 46. Each pillar has a lower end connected to a floor portion of cab 5 and an upper end connected to roof portion 48 of cab 5.

Front pillars 40 include a left pillar 41 and a right pillar 42. Left pillar 41 is arranged at the front left corner of cab 5. Right pillar 42 is arranged at the front right corner of cab 5. Right pillar 42 is arranged on a side closer to work implement 4. Left pillar 41 is arranged on a side further away from work implement 4.

A space surrounded by front pillars 41, 42, the pair of rear pillars 46, roof portion 48, and the floor portion form an indoor space of cab 5. Operator's seat 8 is accommodated in the indoor space of cab 5. Operator's seat 8 is arranged substantially at the center of the floor portion of cab 5. A door for an operator to get in and off cab 5 is provided on the left side surface of cab 5.

A front windshield 47a is arranged between left pillar 41 and right pillar 42. In a state where front windshield 47a is closed, front windshield 47a is arranged in front of operator's seat 8. A rear windshield 47b (FIG. 8) is arranged between the pair of rear pillars 46. Rear windshield 47b is arranged behind operator's seat 8. Each of front windshield 47a and rear windshield 47b has a windshield portion made of a transparent material and a sash portion holding the windshield portion.

The operator sitting on operator's seat 8 can visually recognize an outside of cab 5 through each of front windshield 47a and rear windshield 47b. For example, the operator sitting on operator's seat 8 can directly see bucket 4c for excavating soil, present topography of an execution target, and the like through front windshield 47a. In addition, the operator sitting on operator's seat 8 can directly see the rear of the vehicle body through rear windshield 47b.

A front frame (front beam member) 49a is positioned at the upper front end of cab 5. Front frame 49a connects left pillar 41 and right pillar 42. Front frame 49a is arranged between roof portion 48 and front windshield 47a in a closed state. A rear frame (rear beam member) 49b is positioned at the upper rear end of cab 5. Rear frame 49b connects the pair of rear pillars 46 to each other. Rear frame 49b is arranged between rear windshield 47b and roof portion 48.

Figure 2:
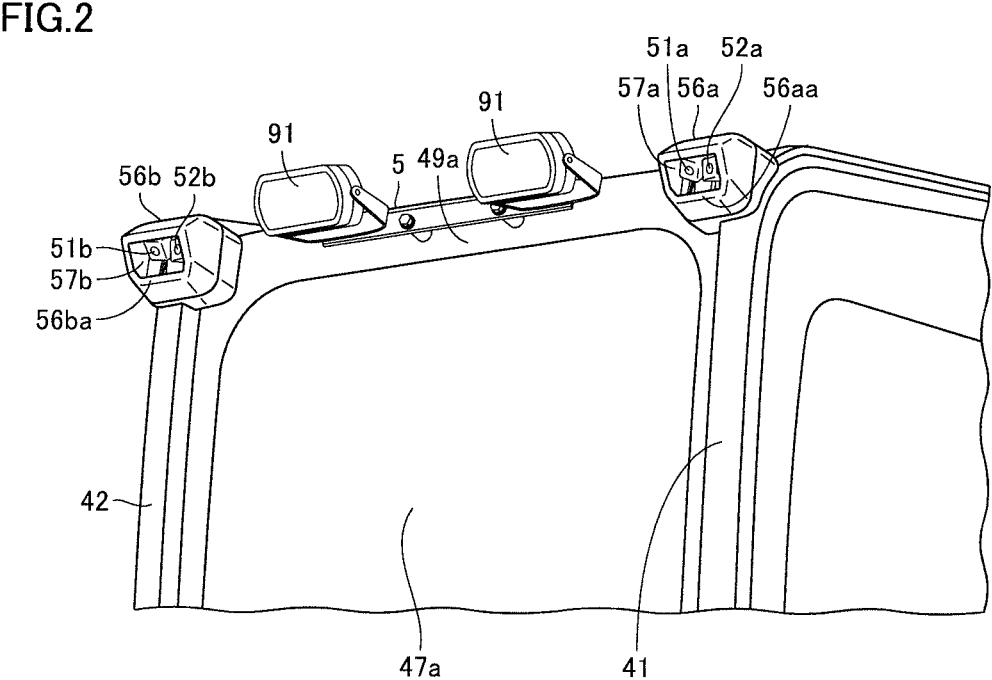
FIG. 2 is a perspective view showing the vicinity of stereo cameras of the hydraulic excavator shown in FIG. 1.
Figure 3:
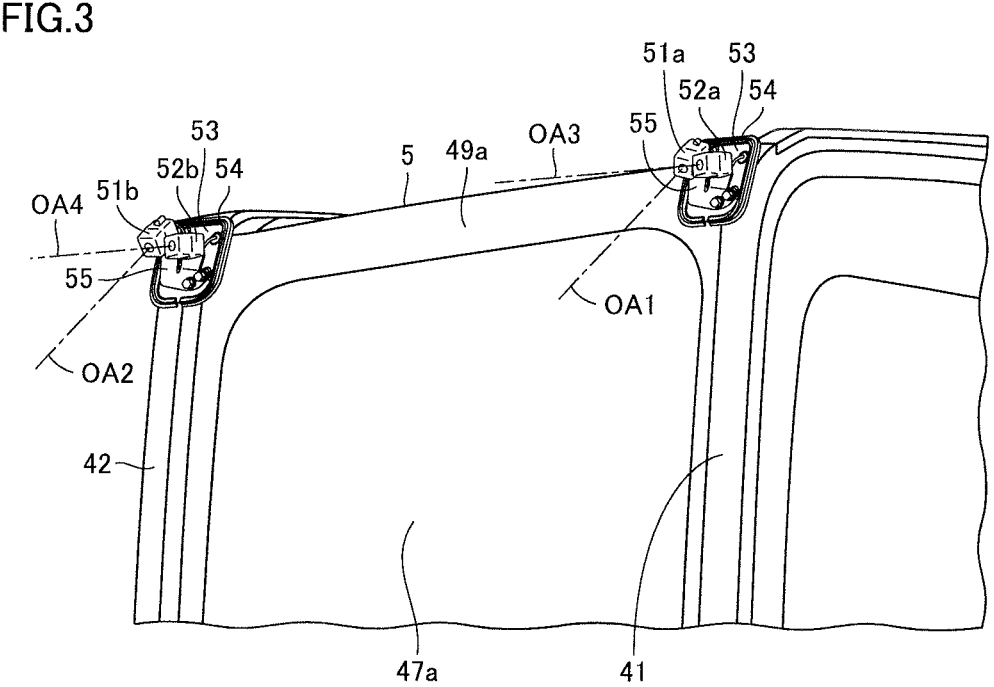
FIG. 3 is a perspective view showing a state where cases of imaging units are omitted from the state shown in FIG. 2.

FIG. 2 is a perspective view showing the vicinity of stereo cameras of the hydraulic excavator shown in FIG. 1. FIG. 3 is a perspective view showing a state where cases of imaging units are omitted from the state shown in FIG. 2.

As shown in FIG. 2, hydraulic excavator 1 has a first stereo camera and a second stereo camera. The first stereo camera has an imaging unit 51a (a first imaging unit) and an imaging unit 51b (a second imaging unit). Each of imaging units 51a, 51b is attached to front frame 49a, at the outside of cab 5. Imaging unit 51a is positioned at a crossing portion between front frame 49a and left pillar 41. Imaging unit 51b is positioned at a crossing portion between front frame 49a and right pillar 42.

Second stereo camera has an imaging unit 52a (third imaging unit) and an imaging unit 52b (fourth imaging unit). Each of imaging units 52a, 52b is attached to front frame 49a, at the outside of cab 5. Imaging unit 52a is positioned at the crossing portion between front frame 49a and left pillar 41. Imaging unit 52b is positioned at the crossing portion between front frame 49a and right pillar 42.

The first stereo camera and the second stereo camera are attached to the outside of cab 5. Each of the first stereo camera and the second stereo camera is attached to front frame 49a.

Imaging unit 51a and imaging unit 52a are accommodated in one case 56a (first case). Case 56a has an opening 56aa at the front. A glass cover 57a (cover) is arranged in opening 56aa. Each of imaging unit 51a and imaging unit 52a can capture an image of the topography in front of hydraulic excavator 1 or the like through glass cover 57a.

Imaging unit 51b and imaging unit 52b are accommodated in one case 56b (second case). Case 56b has an opening 56ba at the front. A glass cover 57b (cover) is arranged in opening 56ba. Each of imaging unit 51b and imaging unit 52b can capture an image of the topography in front of hydraulic excavator 1 or the like through glass cover 57b.

Each of cases 56a, 56b is attached to the outside of cab 5. Cases 56a, 56b of the imaging units are attached on front frame 49a. Case 56a is arranged at a portion where front frame 49a and left pillar 41 cross. Case 56b is arranged at a portion where front frame 49a and right pillar 42 cross.

For example, two headlamps 91 are arranged between cases 56a and 56b. Each of two headlamps 91 is attached to front frame 49a. Each of two headlamps 91 can illuminate an area in front of hydraulic excavator 1 at night or the like.

As shown in FIG. 3, imaging unit 51a and imaging unit 52a are arranged to be juxtaposed in the right-left direction at the crossing portion between front frame 49a and left pillar 41. Imaging unit 51b and imaging unit 52b are arranged to be juxtaposed in the right-left direction at the crossing portion between front frame 49a and right pillar 42.

FIG. 3 shows an optical axis OA1 of imaging unit 51a and an optical axis OA2 of imaging unit 51b in the first stereo camera. In addition, FIG. 3 shows an optical axis OA3 of imaging unit 52a and an optical axis OA4 of imaging unit 52b in the second stereo camera.

Optical axis OA1 of imaging unit 51a and optical axis OA3 of imaging unit 52a are set such that each of optical axis OA1 and optical axis OA3 forms an angle of depression in a state where hydraulic excavator 1 is disposed on a horizontal ground. Optical axis OA1 of imaging unit 51a and optical axis OA3 of imaging unit 52a are inclined with respect to each other. Optical axis OA1 of imaging unit 51a is inclined downward with respect to optical axis OA3 of imaging unit 52a. Therefore, imaging unit 51a can capture an image of topography or the like lower than imaging unit 52a.

Optical axis OA2 of imaging unit 51b and optical axis OA4 of imaging unit 52b are set such that each of optical axis OA2 and optical axis OA4 forms an angle of depression in a state where hydraulic excavator 1 is disposed on a horizontal ground. Optical axis OA2 of imaging unit 51b and optical axis OA4 of imaging unit 52b are inclined with respect to each other. Optical axis OA2 of imaging unit 51b is inclined downward with respect to optical axis OA4 of imaging unit 52b. Therefore, imaging unit 51b can capture an image of topography or the like lower than imaging unit 52b.

Optical axis OA1 of imaging unit 51a and optical axis OA2 of imaging unit 51b have substantially identical inclination angles with respect to a horizontal plane. Optical axis OA3 of imaging unit 52a and optical axis OA4 of imaging unit 52b have substantially identical inclination angles with respect to the horizontal plane.

Next, with reference to FIGS. 4 to 7, configurations of stored objects in cases 56a, 56b will be described by taking the stored objects inside case 56a as examples. Note that the configuration of stored objects in case 56b is substantially identical to the configuration of the stored objects in case 56a, and therefore description thereof will not be repeated.

Figure 4:
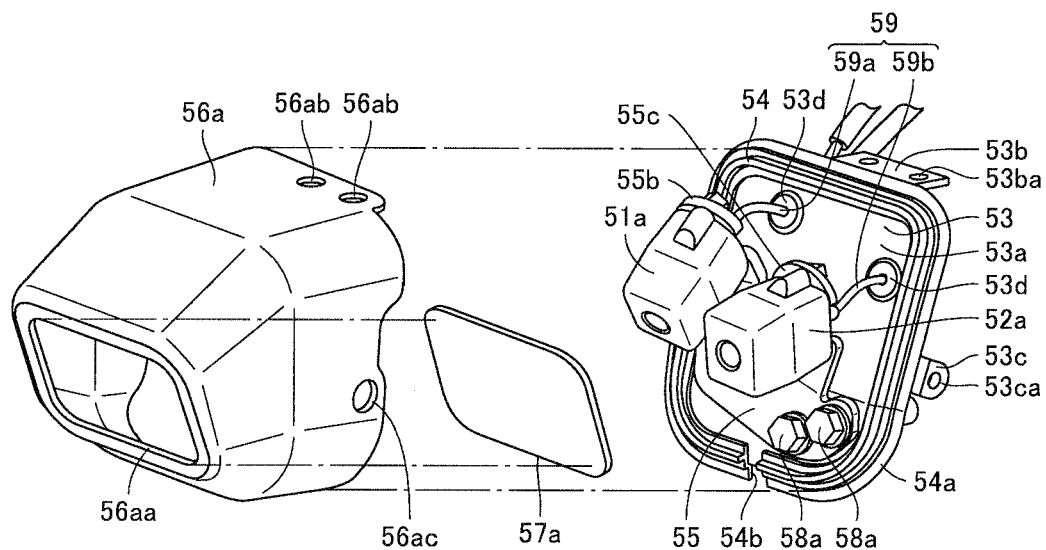
Figure 5:
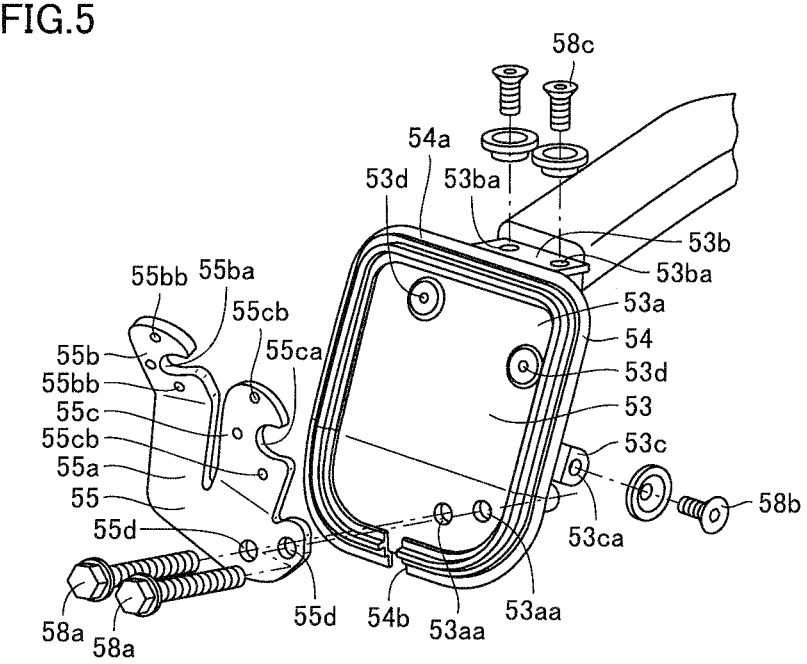
FIG. 5 is an exploded perspective view showing a back plate, a seal member, a bracket, and the like as the stored objects in case 56a shown in FIG. 4.
Figure 6:
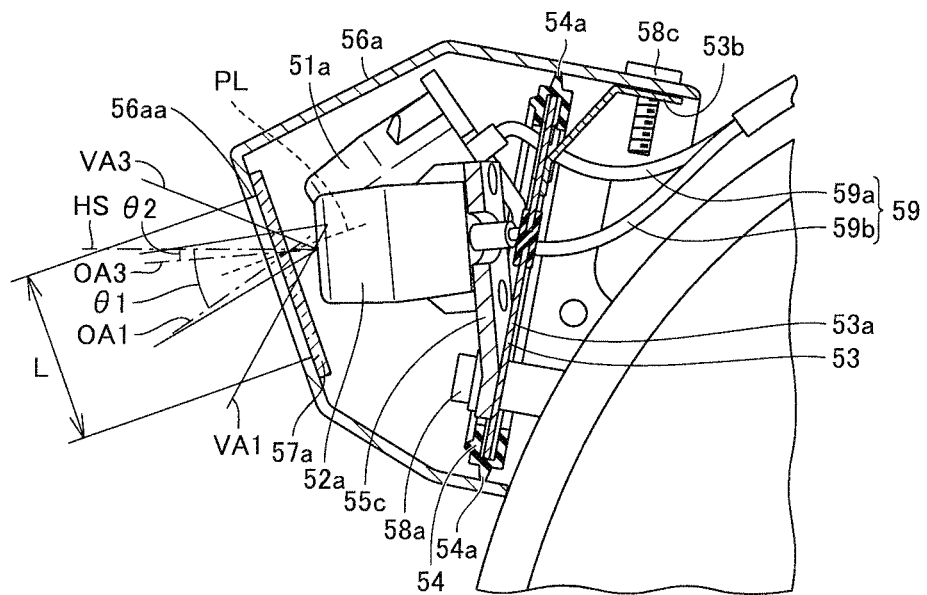
Figure 7:
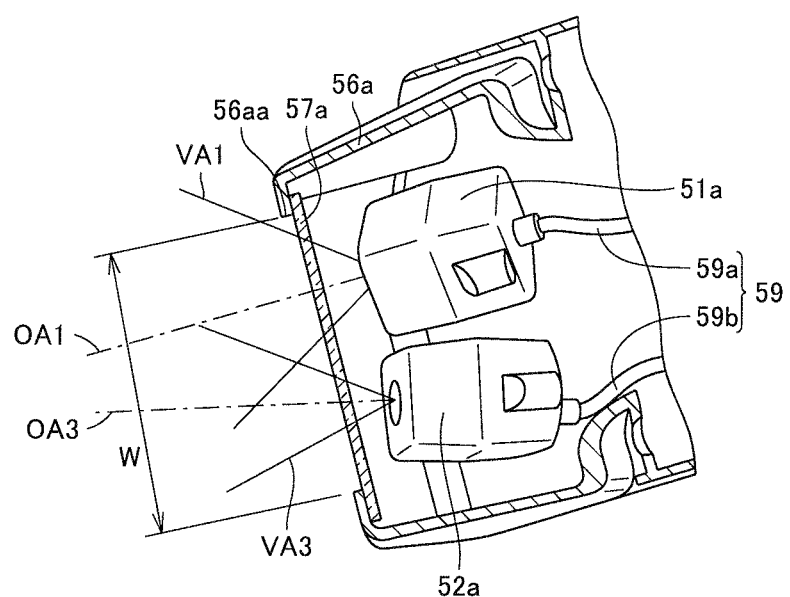

FIG. 4 is an exploded perspective view showing a configuration of a case 56a shown in FIG. 2 and the stored objects in case 56a. FIG. 5 is an exploded perspective view showing a back plate 53, a seal member 54, a bracket 55, and the like as the stored objects in case 56a shown in FIG. 4. FIGS. 6 and 7 are a vertical cross-sectional view and a transverse cross-sectional view showing the configuration inside case 56a shown in FIG. 4, respectively.

As shown in FIG. 4, imaging units 51a, 52a, back plate 53, seal member 54, bracket 55, and glass cover 57a are mainly stored in case 56a. Case 56a has front opening 56aa, insertion holes 56ab provided in a rear upper surface, and an insertion hole 56ac provided in a rear side surface. Transparent glass cover 57a is attached to opening 56aa of case 56a.

Imaging unit 51a and imaging unit 52a are arranged in case 56a. Each of imaging unit 51a and imaging unit 52a is attached to bracket 55. Bracket 55 is attached to back plate 53 by bolts 58a. Seal member 54 is attached to an outer peripheral edge of back plate 53. Seal member 54 is for providing sealing between back plate 53 and case 56a.

As shown in FIG. 5, bracket 55 has a back plate attachment portion 55a, a first support portion 55b, and a second support portion 55c. Back plate attachment portion 55a, first support portion 55b, and second support portion 55c are integrally formed. First support portion 55b and second support portion 55c are not directly connected to each other, but are connected to each other via back plate attachment portion 55a.

Each of first support portion 55b and second support portion 55c is inclined with respect to back plate attachment portion 55a. Each of first support portion 55b and second support portion 55c is inclined toward the front as it proceeds upward from a connection portion between back plate attachment portion 55a and each of first support portion 55b and second support portion 55c.

An inclination angle of first support portion 55b with respect to back plate attachment portion 55a differs from an inclination angle of second support portion 55c with respect to back plate attachment portion 55a. The angle formed by back plate attachment portion 55a and first support portion 55b is smaller than the angle formed by back plate attachment portion 55a and second support portion 55c. In addition, first support portion 55b extends to a location higher than (above) second support portion 55c.

Insertion holes 55d for inserting bolts 58a are provided in back plate attachment portion 55a. Insertion holes 55bb for inserting bolts are provided in first support portion 55b. A notch 55ba is provided in first support portion 55b. Insertion holes 55cb for inserting bolts are provided in second support portion 55c. A notch 55ca is provided in second support portion 55c.

First support portion 55b is a portion for attaching imaging unit 51a as shown in FIG. 4. For example, after the bolts are inserted into insertion holes 55bb of first support portion 55b, the bolts are screwed into the imaging unit 51a. Thus, imaging unit 51a is attached to first support portion 55b. An electric wire 59a (FIG. 4) extending from a back surface of imaging unit 51a is passed through notch 55ba of first support portion 55b in a state where imaging unit 51a is attached to first support portion 55b.

Second support portion 55c is a portion for attaching imaging unit 52a as shown in FIG. 4. For example, after the bolts are inserted into insertion holes 55cb of second support portion 55c, the bolts are screwed into imaging unit 52a. Thus, imaging unit 52a is attached to second support portion 55c. An electric wire 59b (FIG. 4) extending from a back surface of imaging unit 52a is passed through notch 55ca of second support portion 55c in a state where imaging unit 52a is attached to second support portion 55c.

As shown in FIG. 5, back plate 53 has a main body portion 53a, an upper fixture 53b, and a lateral fixture 53c. Main body portion 53a is provided with female screw portions 53aa and electric wire insertion holes 53d. For example, bolts 58a are inserted into insertion holes 55d of bracket 55 and then screwed into female screw portions 53aa of main body portion 53a. Thus, bracket 55 is supported by main body portion 53a.

As shown in FIG. 4, each of electric wire 59a of imaging unit 51a and electric wire 59b of imaging unit 52a passes through electric wire insertion hole 53d of main body portion 53a so as to penetrate main body portion 53a.

As shown in FIG. 5, upper fixture 53b extends rearward from an upper end of main body portion 53a. Upper fixture 53b is provided with female screw portions 53ba. For example, bolts 58c are inserted into insertion holes 56ab (FIG. 4) of case 56a and is screwed into female screw portions 53ba of upper fixture 53b.

Lateral fixture 53c extends rearward from a side end of main body portion 53a. A female screw portion 53ca is provided in lateral fixture 53c. For example, a bolt 58b is inserted into insertion hole 56ac (FIG. 4) of case 56a and is screwed into female screw portion 53ca of lateral fixture 53c.

As shown in FIGS. 4 and 5, bolts 58c are screwed into female screw portions 53ba, and bolt 58b is screwed into female screw portion 53ca. Thus, case 56a is attached to back plate 53.

Seal member 54 is attached so as to surround an outer peripheral edge of main body portion 53a of back plate 53. Seal member 54 is provided with a notch 54b (communicating portion). Notch 54b is configured to make the inside and the outside of case 56a communicate with each other. Notch 54b is positioned at the lowermost portion of seal member 54. As shown in FIG. 4, both imaging units 51a and 52a are arranged at locations higher than the position of notch 54b.

Note that the communicating portion for making the inside and the outside of case 56a communicate with each other only needs to be provided on at least one of seal member 54 and case 56a. In a case where the communicating portion is provided in case 56a, it is preferable that the communicating portion is provided on a lower surface of case 56a.

As shown in FIG. 6, seal member 54 sandwiches a front surface and a rear surface of the outer peripheral edge of main body portion 53a. In a state where case 56a is attached to back plate 53, an outer peripheral end 54a of seal member 54 is in contact with an inner surface of case 56a. Seal member 54 provides sealing between back plate 53 and case 56a. Due to seal member 54, intrusion of water, dust, or the like into an internal space of case 56a (a space where imaging units 51a, 52a are stored) can be suppressed.

In side view shown in FIG. 6, the height position of an intersection between optical axis OA1 of imaging unit 51a and a rear surface of glass cover 57a is identical to the height position of an intersection between optical axis OA3 of imaging unit 52a and the rear surface of glass cover 57a. A perpendicular PL to the rear surface of glass cover 57a in side view is positioned between optical axis OA1 of imaging unit 51a and optical axis OA3 of imaging unit 52a.

Opening 56aa of case 56a has a length L such that case 56a does not block both an angle of view VA1 of imaging unit 51a and an angle of view VA3 of imaging unit 52a in side view. In a state where hydraulic excavator 1 is disposed on a horizontal ground, an angle θ1 formed by optical axis OA1 of imaging unit 51a and a horizontal plane HS is greater than an angle θ2 formed by optical axis OA3 of imaging unit 52a and horizontal plane HS.

As shown in FIG. 7, opening 56aa of case 56a has a width W such that case 56a does not block both angle of view VA1 of imaging unit 51a and angle of view VA3 of the imaging unit 52a in plan view. In plan view shown in FIG. 7, optical axis OA1 of imaging unit 51a and optical axis OA3 of imaging unit 52a are inclined so as to approach each other as they proceed to the front of hydraulic excavator 1.

Next, movement of front windshield 47a and an electronic device electrically connected to the first and second stereo cameras will be described with reference to FIGS. 8 and 9.

Figure 8:
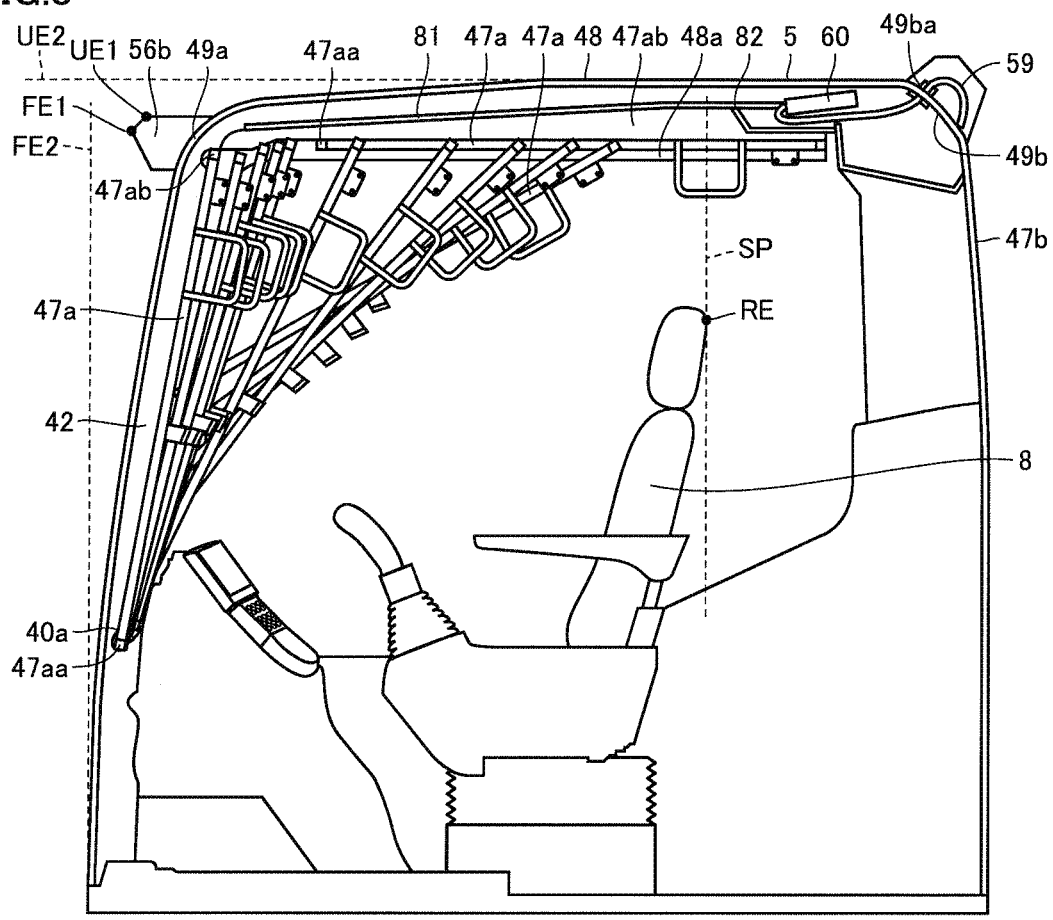
FIG. 8 is a vertical cross-sectional view of a cab of the hydraulic excavator shown in FIG. 1.

FIG. 8 is a vertical cross-sectional view of the cab of the hydraulic excavator shown in FIG. 1. FIG. 9 is an exploded perspective view for illustrating wiring of the stereo cameras and covers of the wiring in the hydraulic excavator shown in FIG. 1.

As shown in FIG. 8, left pillar 41 and right pillar 42 are provided with a pair of first guide rails 40a, respectively. The pair of first guide rails 40a extends in the vertical direction along front pillars 41, 42, respectively. A pair of right and left second guide rails 48a is provided on roof portion 48. Each of the pair of right and left second guide rails 48a extends in the fore/aft direction. First guide rail 40a and second guide rail 48a are connected to each other.

Note that in FIG. 8, only first guide rail 40a of left pillar 42 is shown for the sake of simplification of the drawing; however, first guide rail 40a is also provided on right pillar 41. In addition, in FIG. 8, only right second guide rail 48a from among the pair of second guide rails 48a is shown for the sake of simplification of the drawing; however, second guide rail 48a is also provided on the left side of roof portion 48.

Front windshield 47a has a pair of projecting portions 47aa and a pair of projecting portions 47ab. The pair of projecting portions 47aa is positioned at lower end portions of front windshield 47a and project in the right-left direction when front windshield 47a is in a closed state. The pair of projecting portions 47ab is positioned at upper end portions of front windshield 47a and project in the right-left direction when front windshield 47a is in a closed state.

Projecting portions 47aa, 47ab are movable along first guide rails 40a and second guide rails 48a, respectively. Thus, front windshield 47a is movably supported by first guide rails 40a and second guide rails 48a.

Specifically, front windshield 47a is movable between the closed state and an opened state due to the above-described movement. In a state where front windshield 47a is in the closed state, front windshield 47a is positioned in front of operator's seat 8. In this state, front windshield 47a extends in the vertical direction along front pillars 41, 42. In this state, projecting portions 47aa are positioned below projecting portions 47ab. In this closed state, the operator sitting on operator's seat 8 visually recognizes the front through front windshield 47a.

When front windshield 47a is in the opened state, front windshield 47a is positioned above operator's seat 8. In this state, front windshield 47a extends in the fore/aft direction along roof portion 48. In this state, projecting portions 47aa are positioned in front of projecting portions 47ab and are positioned approximately as high as projecting portions 47ab. In this opened state, the operator sitting on operator's seat 8 visually recognizes the front without front windshield 47a.

When front windshield 47a moves from the closed state to the opened state, projecting portions 47aa at the lower end of front windshield 47a move upward along first guide rails 40a, and then move rearward along second guide rails 48a. In addition, projecting portions 47ab at the upper end of front windshield 47a move rearward along second guide rails 48a.

Electronic device 60 is arranged in the indoor space of cab 5. Electronic device 60 is electrically connected to each of imaging units 51a, 51b, 52a, 52b. Data may be wirelessly transmitted from each of imaging units 51a, 51b, 52a, 52b to electronic device 60. Electronic device 60 has a function of processing imaging data of each of imaging units 51a, 51b, 52a, 52b. For example, electronic device 60 has a function of converting a format of image data captured by each of imaging units 51a, 51b, 52a, 52b.

Electronic device 60 is attached to a ceiling of cab 5. The ceiling is a lower surface side (cab indoor side) of roof portion 48. Electronic device 60 is attached to the ceiling so as to be positioned above front windshield 47a in the opened state. In addition, electronic device 60 is positioned behind operator's seat 8. Specifically, electronic device 60 is positioned behind a fore/aft position SP of a rearmost end RE of operator's seat 8.

Electronic device 60 is electrically connected to each of imaging units 51a, 51b, 52a, 52b by electric wire 59.

Electric wire 59 is connected to a front surface of electronic device 60. Electronic device 60 is inclined such that the front surface to which electric wire 59 is connected is lower and a rear surface of electronic device 60 opposite to the front surface is higher.

The front surface of electronic device 60 projects downward of a ceiling interior material 81. The rear surface of electronic device 60 is positioned above ceiling interior material 81. The lower part of electronic device 60 projecting downward of ceiling interior material 81 is covered with an interior material cover 82. Interior material cover 82 can be attached to and detached from ceiling interior material 81 or the like. Electric wire 59 for connecting electronic device 60 and each of imaging units 51a, 51b, 52a, 52b extends from the inside to the outside of cab 5 through a through hole 49ba provided in rear frame 49b. When it is assumed that interior material cover 82 is part of ceiling interior, it can be said that electronic device 60 is arranged between roof portion 48 and ceiling interior.

In side view, each of front pillars 41, 42 is inclined from the front toward the rear as it proceeds from the bottom to the top. Front ends FE1 of cases 56a, 56b are positioned behind a front end position FE2 of cab 5. An uppermost height position UE1 of each of cases 56a, 56b is lower than a height position UE2 at the upper end of cab 5.

Figure 9:
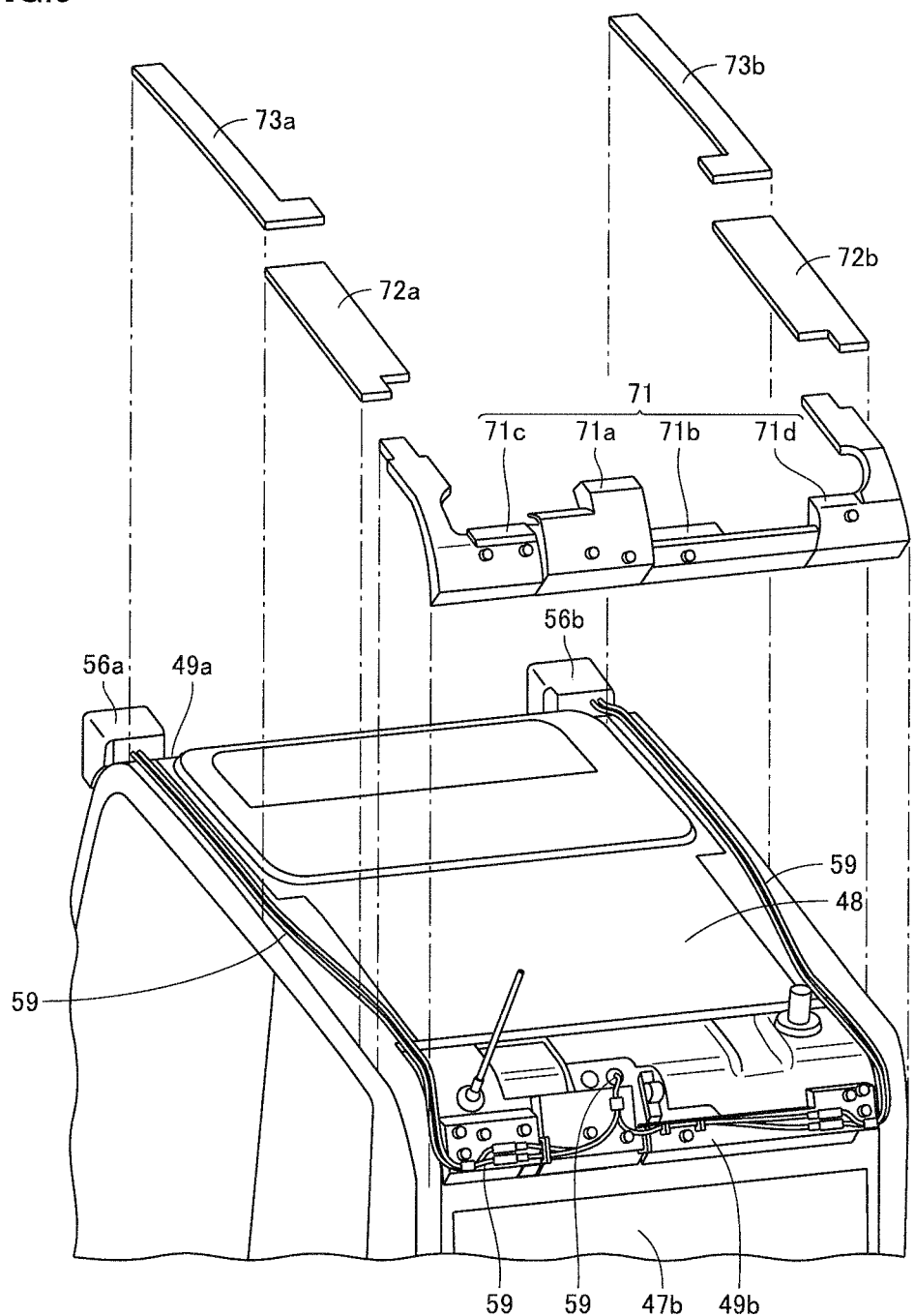
FIG. 9 is an exploded perspective view for illustrating wiring of the cameras and covers of the wiring in the hydraulic excavator shown in FIG. 1.

As shown in FIG. 9, electric wire 59 for connecting electronic device 60 and imaging units 51a, 51b, 52a, 52b extends on roof portion 48. Electric wire 59 extends on roof portion 48 from front frame 49a to rear frame 49b. Covers 72a, 72b, 73a, 73b are attached to roof portion 48 so as to cover electric wire 59 positioned on roof portion 48.

Covers 73a, 73b are attached to the front side (front frame 49a side) of roof portion 48. Covers 73a, 73b are attached on the left and right sides, respectively. Covers 72a, 72b are attached between rear frame 49b and covers 73a, 73b, respectively. Covers 72a, 72b are attached to the left and right sides, respectively.

A cover 71 is attached to rear frame 49b so as to cover electric wire 59 positioned on rear frame 49b. Cover 71 is configured of a plurality of cover portions 71a, 71b, 71c, 71d, for example.

Next, imaging ranges of imaging units 51a, 51b, 52a, 52b and synthesis of stereo image data will be described with reference to FIGS. 10 and 11.

Figure 10:
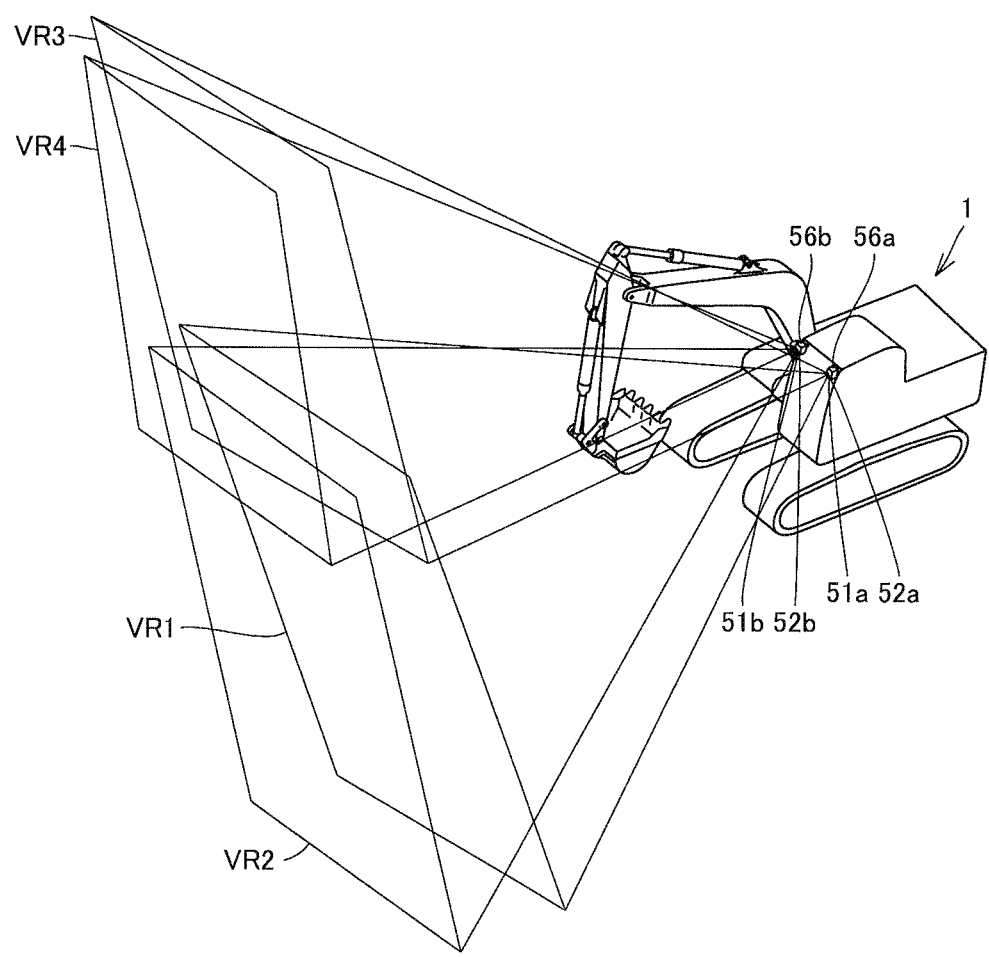
FIG. 10 is a schematic view showing an imaging range of each imaging unit.

FIG. 10 is a schematic view showing an imaging range of each imaging unit. FIG. 11 is a functional block diagram showing a configuration of a stereo image data synthesizing system.

As shown in FIG. 10, for example, imaging unit 51a can capture an image of an imaging range VR1. For example, imaging unit 51b can capture an image of imaging range VR2. For example, imaging unit 52a can capture an image of imaging range VR3. For example, imaging unit 52b can capture an image of imaging range VR4.

Imaging range VR1 of imaging unit 51a and imaging range VR2 of imaging unit 51b partially overlap each other horizontally. Imaging range VR3 of imaging unit 52a and imaging range VR4 of imaging unit 52b partially overlap each other horizontally.

Imaging range VR1 of imaging unit 51a and imaging range VR3 of imaging unit 52a partially overlap each other vertically. Imaging range VR2 of imaging unit 51b and imaging range VR4 of imaging unit 52b partially overlap each other vertically.

As described above, since imaging range VR1 of imaging unit 51a and imaging range VR2 of imaging unit 51b partially overlap each other horizontally, it is possible to construct a three-dimensional image of an object to be imaged by performing a stereoscopic process on an image captured by imaging unit 51a and an image captured by imaging unit 51b.

In addition, since imaging range VR3 of imaging unit 52a and imaging range VR4 of imaging unit 52b partially overlap each other horizontally, it is possible to construct a three-dimensional image of an object to be imaged by performing a stereoscopic process on an image captured by imaging unit 52a and an image captured by imaging unit 52b.

In addition, by vertically synthesizing the three-dimensional image constructed from the images captured by imaging units 51a and 51b and the three-dimensional image constructed from the images captured by imaging units 52a and 52b, a three-dimensional image in a wide range (for example, three-dimensional present topography) can be obtained.

Figure 11:
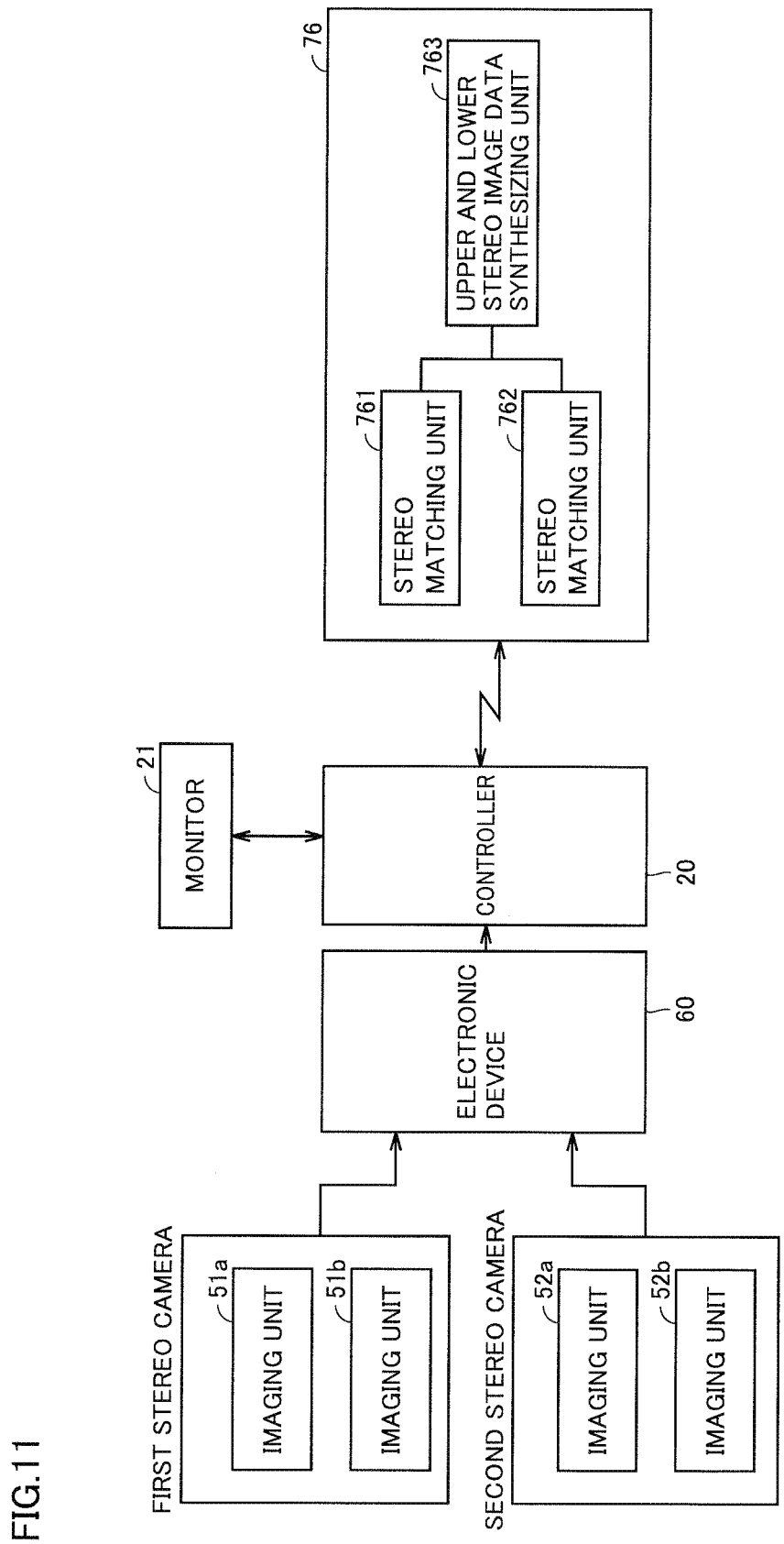
FIG. 11 is a functional block diagram showing a configuration of a stereo image data synthesizing system.

As shown in FIG. 11, the first stereo camera is configured of imaging unit 51a and imaging unit 51b. The second stereo camera is configured of imaging unit 52a and imaging unit 52b. Imaging units 51a, 51b of the first stereo camera and imaging units 52a, 52b of the second stereo camera are electrically connected to a controller 20 via electronic device 60.

Imaging unit 51a and imaging unit 51b synchronously capture images of an area in front of the vehicle body (imaging ranges VR1, VR2 shown in FIG. 10). Two-dimensional images captured by imaging unit 51a and imaging unit 51b are input to controller 20 via electronic device 60. Controller 20 transmits data regarding the two input two-dimensional images to an external monitoring station 76.

Monitoring station 76 has a stereo matching unit 761. Stereo matching unit 761 constitutes part of the image data generation system. Stereo matching unit 761 performs stereo matching on the two-dimensional images captured simultaneously by imaging unit 51a and imaging unit 51b from different angles, and calculates image data regarding the three-dimensional shape of a front area to be imaged. More specifically, based on a parallax between imaging unit 51a and imaging unit 51b, stereo matching unit 761 calculates the distance from imaging unit 51a to the front area to be imaged and the distance from imaging unit 52a to the front area by using the principle of triangulation to calculate the three-dimensional shape of the front area.

Imaging unit 52a and imaging unit 52b synchronously capture images of an area in front of the vehicle body (imaging ranges VR3, VR4 shown in FIG. 10). Two-dimensional images captured by imaging unit 52a and imaging unit 52b are input to controller 20 via electronic device 60. Controller 20 transmits data regarding the two input two-dimensional images to external monitoring station 76.

Monitoring station 76 has a stereo matching unit 762. Stereo matching unit 762 constitutes part of the image data generation system. Stereo matching unit 762 performs stereo matching on the two-dimensional images captured simultaneously by imaging unit 52a and imaging unit 52b from different angles, and calculates image data regarding the three-dimensional shape of a front area to be imaged. More specifically, based on a parallax between imaging unit 52a and imaging unit 52b, stereo matching unit 762 calculates the distance from imaging unit 52a to the front area to be imaged and the distance from imaging unit 52b to the front area by using the principle of triangulation to calculate the three-dimensional shape of the front area.

As described with reference to FIG. 10, imaging ranges VR1, VR2 imaged by the first stereo camera are on a lower side as viewed from the operator. Imaging ranges VR3, VR4 imaged by the second stereo camera are on an upper side as viewed from the operator. Imaging ranges VR1 and VR2 imaged by the first stereo camera and imaging ranges VR3, VR4 imaged by the second stereo camera partially overlap each other in the vertical direction.

Therefore, in FIG. 11, the three-dimensional shape of the front area obtained by stereo matching unit 761 represents topography of the lower side as viewed from the operator, and the three-dimensional shape of the front area obtained by stereo matching unit 762 represents topography of the upper side as viewed from the operator. Part of the three-dimensional shape obtained by stereo matching unit 761 and part of the three-dimensional shape obtained by stereo matching unit 762 overlapping each other have identical shapes.

Monitoring station 76 further has an upper and lower stereo image data synthesizing unit 763. Upper and lower stereo image data synthesizing unit 763 synthesizes the image data calculated by stereo matching unit 761 and the image data calculated by stereo matching unit 762 into one piece of data. The image data is synthesized by projecting one piece of image data on a coordinate system of the other piece of image data, based on the relative position between the first stereo camera and the second stereo camera. By vertically arranging and synthesizing the two pieces of image data such that the identical three-dimensional shapes are superimposed, image data showing a three-dimensional shape where imaging ranges VR1 to VR4 shown in FIG. 10 are widely synthesized is obtained.

The three-dimensional image data (topography data) obtained as described above is transmitted to controller 20. Controller 20 displays the three-dimensional image data on a monitor 21. The operator can perform an operation such as excavation while checking the three-dimensional image data displayed on monitor 21.

In recent years, information-oriented construction has been widespread in order to improve productivity of a work vehicle by using position measurement of the work vehicle based on a global positioning system, three-dimensional civil engineering construction data, and three-dimensional present topography data. Improvement of productivity can be achieved by carrying out information-oriented construction by combining three-dimensional present topography data obtained by the first and second stereo cameras with the global positioning system.

A function and effect of the present embodiment will now be described.

In the present embodiment, as shown in FIGS. 1 and 2, case 56a and case 56b are attached to the outside of cab 5. Therefore, as shown in FIG. 8, case 56a and case 56b do not interfere with front windshield 47a when front windshield 47a is opened or closed. Therefore, front windshield 47a of cab 5 can be opened.

In addition, it is not necessary to attach a mechanism for moving the positions of case 56a and case 56b in order to avoid interference with front windshield 47a. Therefore, the positions of case 56a and case 56b can be fixed and attached to cab 5. Therefore, cases 56a, 56b and the first and second stereo cameras can be accurately attached to cab 5.

In addition, in a case where cases 56a, 56b are attached to the indoor space of cab 5, cases 56a, 56b may block view of the operator. In contrast, in the present embodiment, cases 56a, 56b are attached to the outside of cab 5. Therefore, cases 56a, 56b do not block view of the operator. Therefore, visibility of the operator is good.

As shown in FIG. 2, front frame 49a is positioned at the upper front end of cab 5. Each of case 56a and case 56b is attached to front frame 49a. Therefore, each of imaging units 51a, 52a accommodated in case 56a and imaging units 51b, 52b accommodated in case 56b can capture an image from a viewpoint close to the viewpoint of the operator.

As shown in FIG. 3, imaging unit 51a is arranged at the crossing portion between front frame 49a and left pillar 41, and imaging unit 51b is arranged at the crossing portion between front frame 49a and right pillar 42. Thus, a large interval can be secured between imaging unit 51a and imaging unit 51b in the right-left direction in the first stereo camera. Therefore, a surveying error of the first stereo camera can be reduced.

Imaging unit 52a is arranged at the crossing portion between front frame 49a and left pillar 41, and imaging unit 52b is arranged at the crossing portion between front frame 49a and right pillar 42. Thus, a large interval can be secured between imaging unit 52a and imaging unit 52b in the right-left direction also in the second stereo camera. Therefore, a surveying error of the second stereo camera can be reduced.

As shown in FIG. 8, electronic device 60 electrically connected to each of imaging units 51a, 52a, 51b, 52b is attached to the ceiling of cab 5. By attaching electronic device 60 to the ceiling, it is easy to secure the arrangement space of electronic device 60. In addition, the wiring length of electric wire 59 connecting each of imaging units 51a, 51b, 52a, 52b attached to front frame 49a and electronic device 60 can be made shorter than that in a case where electronic device 60 is arranged near the floor surface of cab 5.

As shown in FIG. 8, each of electronic device 60 and interior material cover 82 is positioned above front windshield 47a in the opened state. Therefore, when front windshield 47a is opened or closed, front windshield 47a is prevented from interfering with each of electronic device 60 and interior material cover 82.

In side view shown in FIG. 8, each of front pillars 41, 42 is inclined from the front toward the rear as it proceeds from the bottom to the top. Therefore, front ends FE1 of cases 56a, 56b are positioned behind front end position FE2 of cab 5. Therefore, even in a case where a plurality of cabs 5 is arranged in the fore/aft direction during transportation of cabs 5, preceding cab 5 is not hit by each of cases 56a, 56b of cab 5 positioned behind. Thus, damage to cab 5 and cases 56a, 56b during transportation of cabs 5 can be suppressed.

As shown in FIG. 8, electronic device 60 is positioned behind operator's seat 8. In addition, electric wire 59 is connected to the front surface of electronic device 60. Thus, the operator in the vicinity of operator's seat 8 can easily access a connection portion between electronic device 60 and electric wire 59. This facilitates maintenance of electronic device 60.

As shown in FIG. 8, electronic device 60 is inclined such that the front surface of electronic device 60 to which electric wire 59 is connected is lower than the rear surface of electronic device 60. As described, since the front surface of electronic device 60 to which electric wire 59 is connected is positioned lower, the operator can more easily access the connection portion between electronic device 60 and electric wire 59. This further facilitates maintenance of electronic device 60.

As shown in FIG. 8, the front surface of electronic device 60 to which electric wire 59 is connected projects downward of ceiling interior material 81. Therefore, by detaching interior material cover 82 from ceiling interior material 81, it is possible to easily attach and detach electric wire 59 to and from electronic device 60.

In a case where a hole through which electric wire 59 is passed is provided in roof portion 48, water leakage from the outside to the inside of cab 5 is likely to occur. In addition, in a case where a hole through which electric wire 59 is passed is provided in rear windshield 47*b*, rear visibility of the operator is deteriorated. In the present embodiment, as shown in FIG. 8, through hole 49*ba* through which electric wire 59 is passed is provided in rear frame 49*b*. Therefore, rear visibility of the operator can be satisfactory maintained while water leakage into the inside of cab 5 is suppressed.

As shown in FIG. 6, in side view, the height position of the intersection between optical axis OA1 of imaging unit 51*a* and the rear surface of glass cover 57*a* is identical to the height position of the intersection between optical axis OA3 of imaging unit 52*a* and the rear surface of glass cover 57*a*. Therefore, length L of opening 56*aa* of case 56*a* can be shortened without blocking both angle of view VAT of imaging unit 51*a* and angle of view VA3 of imaging unit 52*a* in side view. Thus, the size of glass cover 57*a* can be reduced. Glass cover 57*a* is likely to be damaged or broken by a scattered object generated during an operation. By reducing a dimension of glass cover 57*a*, damage to and breakage of glass cover 57*a* caused by the scattered object can be suppressed.

As shown in FIG. 7, in plan view, optical axis OA1 of imaging unit 51*a* and optical axis OA3 of imaging unit 52*a* are inclined so as to approach each other as they proceed to the front of hydraulic excavator 1. Therefore, width W of opening 56*aa* of case 56*a* can be shortened without blocking both angle of view VA1 of imaging unit 51*a* and angle of view VA3 of imaging unit 52*a* in plan view. Thus, the size of glass cover 57*a* can be reduced. Similarly to the above, damage to and breakage of glass cover 57*a* caused by the scattered object can be suppressed.

In addition, as shown in FIGS. 4 and 5, at least one of seal member 54 and case 56*a* is provided with the communicating portion (for example, notch 54*b*) for making the inside and the outside of case 56*a* communicate with each other. Therefore, condensation inside case 56*a* is suppressed.

Notch 54*b* is provided at the lowermost portion of seal member 54. Both imaging units 51*a* and 52*a* are arranged at locations higher than (above) the position of notch 54*b*. Therefore, even if water, dust, or the like intrudes into case 56*a* from notch 54*b*, adhesion of water, dust, or the like to imaging units 51*a*, 52*a* is suppressed.

As shown in FIG. 5, bracket 55 is configured such that first support portion 55*b* and second support portion 55*c* of bracket 55 are integrated. Thus, an increase in the number of parts can be suppressed. In addition, angles of optical axes OA1, OA3 of imaging units 51*a*, 52*a* can be easily set.

As shown in FIG. 6, in a state in which hydraulic excavator 1 is disposed on a horizontal ground, each of optical axes OA1 to OA4 of imaging units 51*a*, 52*a*, 51*b*, 52*b* is set at an angle of depression. An operation site in a work vehicle such as a hydraulic excavator is the ground. Therefore, by setting each of optical axes OA1 to OA4 at an angle of depression, three-dimensional present topography data of a horizontal or nearly horizontal ground can be easily obtained.

However, a site to be operated is not limited to be horizontal and may be inclined upward from the front of the work vehicle such as hydraulic excavator 1. In the present embodiment, as shown in FIG. 6, in a state where hydraulic excavator (work vehicle) is disposed on a horizontal ground, first angle θ1 formed by optical axis OA1 of imaging unit 51*a* and horizontal plane HS is greater than second angle θ2 formed by optical axis OA3 of imaging unit 52*a* and horizontal plane HS. Thus, as shown in FIG. 10, it is possible to capture an image of lower imaging range VR1 by imaging unit 51*a* and an image of upper imaging range VR2 by imaging unit 52*a* simultaneously. Therefore, even in a case where a site to be operated is inclined upward from the front of work vehicle 1, three-dimensional present topography data of an inclined part to be operated can be easily obtained.

In addition, as shown in FIG. 3, in a state where hydraulic excavator 1 (work vehicle) is disposed on the horizontal ground, a third angle formed by optical axis OA2 of imaging unit 51*b* and the horizontal plane is greater than a fourth angle formed by optical axis OA4 of imaging unit 52*b* and the horizontal plane. Thus, as shown in FIG. 10, it is possible to capture an image of lower imaging range VR1 by imaging unit 51*a* and an image of upper imaging range VR2 by imaging unit 52*a* simultaneously. Therefore, even in a case where a site to be operated is inclined upward from the front of work vehicle 1, three-dimensional present topography data of an inclined part to be operated can be easily obtained.

As shown in FIG. 8, uppermost height position UE1 of case 56*b* is lower than height position UE2 at the upper end of cab 5. By setting uppermost height position UE1 of case 56*b* as described above, case 56*b* can be arranged avoiding the trajectory of the bucket. Thus, interference between case 56*b* and bucket 4*c* can be prevented.

In addition, since front end FE1 of case 56*b* is positioned behind front end position FE2 of cab 5, interference between case 56*b* and bucket 4*c* can be further prevented.

Other Embodiments

Next, a work vehicle according to another embodiment will be described with reference to FIGS. 12 to 15.

Figure 12:
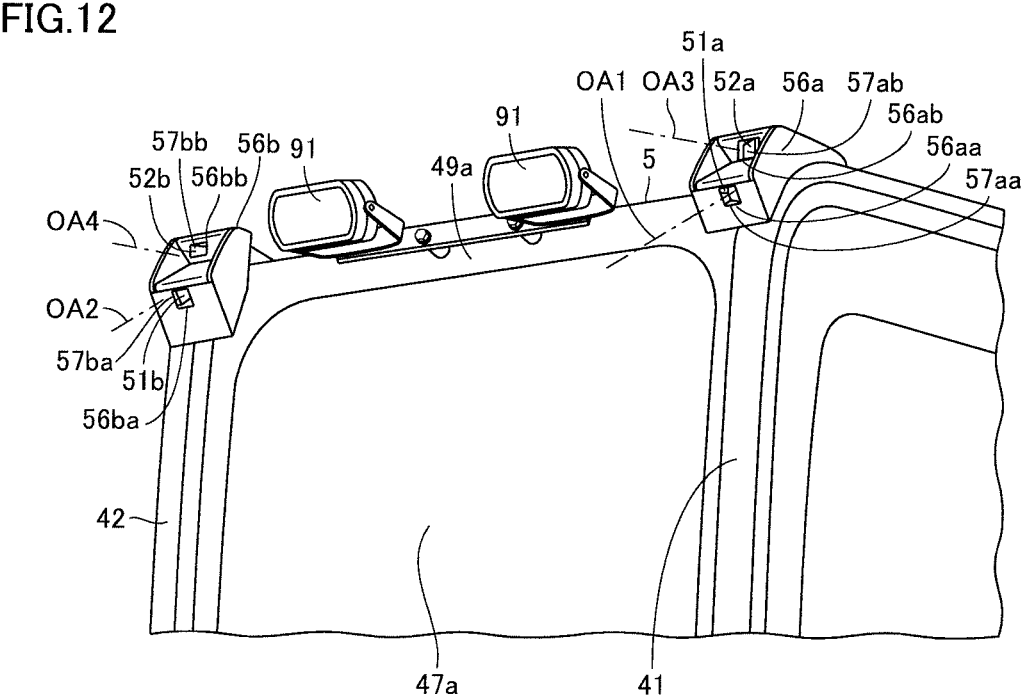
FIG. 12 is a perspective view schematically showing a configuration of a hydraulic excavator according to another embodiment.
Figure 13:
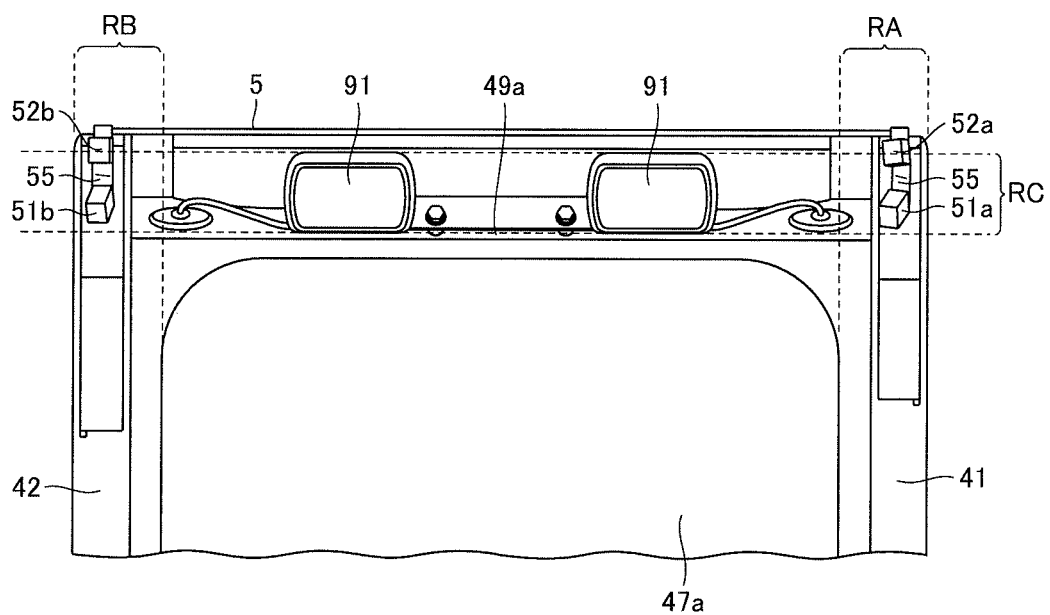
FIG. 13 is a front view showing the vicinity of stereo cameras of the hydraulic excavator shown in FIG. 12.
Figure 14:
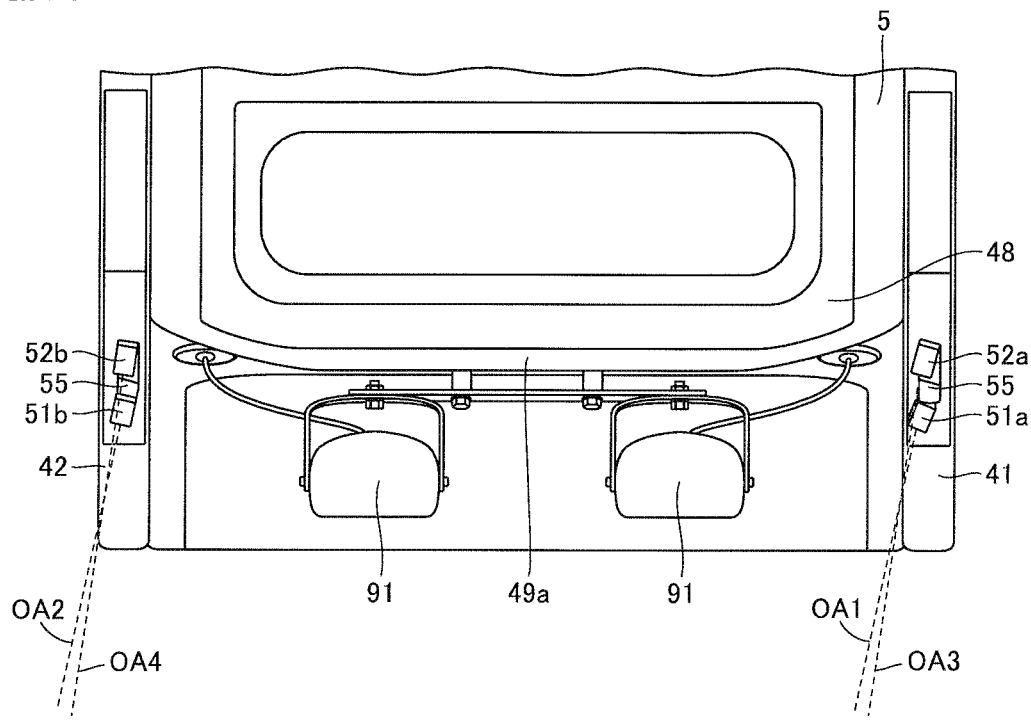
FIG. 14 is a plan view showing the vicinity of the stereo cameras of the hydraulic excavator shown in FIG. 12.
Figure 15:
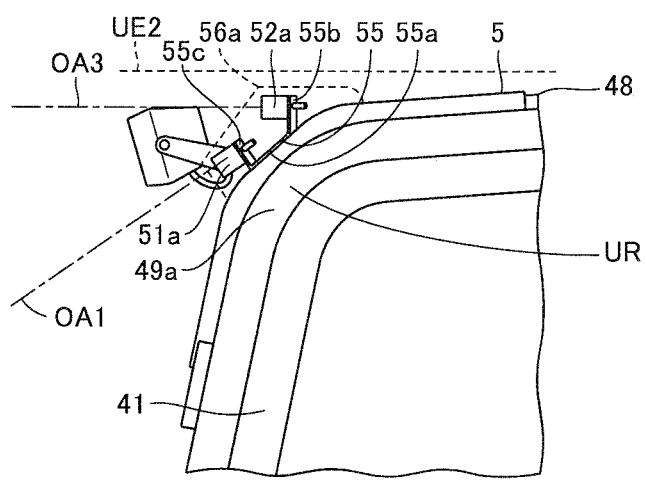
FIG. 15 is a side view showing the vicinity of the stereo cameras of the hydraulic excavator shown in FIG. 12.

FIG. 12 is a perspective view schematically showing a configuration of a hydraulic excavator according to the other embodiment. FIGS. 13, 14, and 15 are a front view, a plan view, and a side view showing the vicinity of stereo cameras of the hydraulic excavator shown in FIG. 12, respectively.

As shown in FIG. 12, the configuration of the present embodiment differs from the configuration of the one embodiment shown in FIGS. 1 to 11 in configurations of first and second stereo cameras.

In the present embodiment, the first stereo camera has an imaging unit 51*a* (first imaging unit) and an imaging unit 51*b* (second imaging unit). The second stereo camera has an imaging unit 52*a* (third imaging unit) and an imaging unit 52*b* (fourth imaging unit).

Imaging unit 51*a* and imaging unit 52*a* are accommodated in one case 56*a* (first case). Case 56*a* has two opening 56*aa*, 56*ab* at the front. Two openings 56*aa* and 56*ab* are arranged in line in the vertical direction, and opening 56*aa* is arranged below opening 56*ab*.

Glass covers 57*aa*, 57*ab* (covers) are arranged in two openings 56*aa*, 56*ab*, respectively. Imaging unit 51*a* can capture an image of the topography or the like in front of hydraulic excavator 1 through glass cover 57*aa*, and imaging unit 52*a* can capture an image of the topography or the like in front of hydraulic excavator 1 through glass cover 57*ab*.

Imaging unit 51*b* and imaging unit 52*b* are accommodated in one case 56*b* (second case). Case 56*b* has two openings 56*ba*, 56*bb* at the front. Two openings 56*ba* and 56*bb* are arranged in line in the vertical direction, and opening 56*ba* is arranged below opening 56*bb*.

Glass covers 57*ba*, 57*bb* (covers) are arranged in two openings 56*ba*, 56*bb*, respectively. Imaging unit 51*b* can capture an image of the topography or the like in front of hydraulic excavator 1 through glass cover 57*ba*, and imaging unit 52*b* can capture an image of the topography or the like in front of hydraulic excavator 1 through glass cover 57*bb*.

Each of cases 56*a*, 56*b* is attached to the outside of a cab 5. Case 56*a* is attached to at least one of a front frame 49*a* and a left pillar 41. Case 56*a* is arranged at a portion where front frame 49*a* and left pillar 41 cross. Case 56*b* is attached to at least one of front frame 49*a* and a right pillar 42. Case 56*b* is arranged at a portion where front frame 49*a* and right pillar 42 cross.

For example, two headlamps 91 are arranged between cases 56*a* and 56*b*. Each of two headlamps 91 is attached to front frame 49*a*. Each of two headlamps 91 can illuminate an area in front of hydraulic excavator 1 at night or the like.

Imaging unit 51*a* and imaging unit 52*a* are arranged in line in the vertical direction. Imaging unit 51*a* is arranged below imaging unit 52*a*. Imaging unit 51*b* and imaging unit 52*b* are arranged in line in the vertical direction. Imaging unit 51*b* is arranged below imaging unit 52*b*.

FIG. 12 shows an optical axis OA1 of imaging unit 51*a* and an optical axis OA2 of imaging unit 51*b*. In addition, FIG. 12 shows an optical axis OA3 of imaging unit 52*a* and an optical axis OA4 of imaging unit 52*b*.

Optical axis OA1 of imaging unit 51*a* and optical axis OA3 of imaging unit 52*a* are set such that each of optical axis OA1 and optical axis OA3 forms an angle of depression in a state where hydraulic excavator 1 is disposed on a horizontal ground. Optical axis OA1 of imaging unit 51*a* and optical axis OA3 of imaging unit 52*a* are inclined with respect to each other. Optical axis OA1 of imaging unit 51*a* is inclined downward with respect to optical axis OA3 of imaging unit 52*a*. Therefore, imaging unit 51*a* can capture an image of topography or the like lower than imaging unit 52*a*.

Optical axis OA2 of imaging unit 51*b* and optical axis OA4 of imaging unit 52*b* are set such that each of optical axis OA2 and optical axis OA4 forms an angle of depression in a state where hydraulic excavator 1 is disposed on a horizontal ground. Optical axis OA2 of imaging unit 51*b* and optical axis OA4 of imaging unit 52*b* are inclined with respect to each other. Optical axis OA3 of imaging unit 51*b* is inclined downward with respect to optical axis OA4 of imaging unit 52*b*. Therefore, imaging unit 51*b* can capture an image of topography or the like lower than imaging unit 52*b*.

Optical axis OA1 of imaging unit 51*a* and optical axis OA2 of imaging unit 51*b* have substantially identical inclination angles with respect to a horizontal plane. Optical axis OA3 of imaging unit 52*a* and optical axis OA4 of imaging unit 52*b* have substantially identical inclination angles with respect to the horizontal plane.

In a state where hydraulic excavator 1 is disposed on the horizontal ground, an angle formed by optical axis OA1 of imaging unit 51*a* and the horizontal plane is greater than an angle formed by optical axis OA3 of imaging unit 52*a* and the horizontal plane. In addition, in a state where hydraulic excavator 1 is disposed on the horizontal ground, an angle formed by optical axis OA2 of imaging unit 51*b* and the horizontal plane is greater than an angle formed by optical axis OA4 of imaging unit 52*b* and the horizontal plane.

As shown in FIG. 13, each of imaging units 51*a*, 52*a* is attached to at least one of front frame 49*a* and left pillar 41, at the outside of cab 5. Each of imaging units 51*a*, 52*a* is arranged at a portion where front frame 49*a* and left pillar 41 cross.

Each of imaging units 51*b*, 52*b* is attached to at least one of front frame 49*a* and right pillar 42, at the outside of cab 5. Each of imaging units 51*b*, 52*b* is arranged at a portion where front frame 49*a* and right pillar 42 cross.

Each of imaging unit 51*a* and imaging unit 52*a* is arranged so as to overlap at least one of left pillar 41 and an extended area RA of left pillar 41 in front view. Each of imaging unit 51*b* and imaging unit 52*b* is arranged so as to overlap right pillar 42 and an extended area RB of right pillar 42 in front view.

Thus, a large interval can be secured between imaging unit 51*a* and imaging unit 51*b* in the right-left direction. Therefore, a surveying error of the first stereo camera configured of imaging units 51*a*, 51*b* can be reduced and accuracy can be improved. In addition, a large interval can be secured between imaging unit 52*a* and imaging unit 52*b* in the right-left direction. Therefore, a surveying error of the second stereo camera configured of imaging units 52*a*, 52*b* can be reduced and accuracy can be improved.

Each of imaging unit 51*a* and imaging unit 52*a* is attached to left pillar 41 and extended area RA of left pillar 41. Each of imaging unit 51*b* and imaging unit 52*b* is attached to right pillar 42 and extended area RB of right pillar 42.

In a work vehicle such as hydraulic excavator 1, protection of the operator upon rollover of the work vehicle is very important. For this reason, a work vehicle such as hydraulic excavator 1 employs a cab adopting a rollover protective structure (ROPS), that is, a so-called ROPS cab. In this ROPS cab, strength of front pillars positioned on side surfaces of the cab, right and left sides of a roof portion, rear pillars and both right and left sides of a floor portion are greatly increased than that of other parts. Therefore, by attaching imaging units 51*a*, 51*b*, 52*a*, 52*b* to rigid front pillars 41, 42 and extended areas RA, RB of rigid front pillars 41, 42, shift of optical axes OA1 to OA4 of imaging units 51*a*, 51*b*, 52*a*, 52*b* can be suppressed.

Each of the horizontal width (width in the right-left direction) of imaging unit 51*a* and the horizontal width of imaging unit 52*a* is narrower than the horizontal width of left pillar 41. In addition, each of the horizontal width (width in the right-left direction) of imaging unit 51*b* and the horizontal width of imaging unit 52*b* is narrower than the horizontal width of right pillar 42.

As shown in FIG. 14, each of imaging unit 51*a* and imaging unit 52*a* is arranged so as to overlap left pillar 41 in plan view. Each of imaging unit 51*b* and imaging unit 52*b* is arranged so as to overlap right pillar 42 in plan view.

Each of optical axis OA1 of imaging unit 51*a*, optical axis OA2 of imaging unit 51*b*, optical axis OA3 of imaging unit 52*a*, and optical axis OA4 of imaging unit 52*b* is inclined toward a work implement 4 (FIG. 1) as it proceeds to the front in plan view.

In plan view, optical axis OA1 of imaging unit 51*a* is inclined closer to work implement 4 than optical axis OA3 of imaging unit 52*a* is as they proceed to the front. In plan view, optical axis OA2 of imaging unit 51*b* is inclined closer to work implement 4 than optical axis OA4 of imaging unit 52*b* is as they proceed to the front.

As shown in FIG. 15, imaging unit 51*a* is positioned in front of imaging unit 52*a*. Imaging unit 51*b* is positioned in front of imaging unit 52*b*.

Each of imaging unit 51*a* and imaging unit 52*a* is attached to an upper end bent portion UR of left pillar 41 in side view.

Each of imaging unit 51b and imaging unit 52b is attached to an upper end bent portion of right pillar 42 in side view.

The uppermost height position of case 56a accommodating imaging unit 51a and imaging unit 52a is lower than a height position UE2 of the upper end of cab 5. The uppermost height position of case 56b accommodating imaging unit 51b and imaging unit 52b inside is lower than height position UE2 of the upper end of cab 5.

Note that since the configuration of the present embodiment other than the above is substantially identical to that of the one embodiment shown in FIGS. 1 to 11, identical elements are denoted by identical reference signs, and description thereof will not be repeated.

In the present embodiment, as shown in FIG. 13, imaging unit 51a and imaging unit 52a are arranged in the vertical direction, and imaging unit 51b and imaging unit 52b are arranged in the vertical direction. Therefore, according to the present embodiment, it is possible to secure a wider interval in the right-left direction between imaging unit 51a and imaging unit 51b constituting the first stereo camera, than that in the one embodiment. Therefore, accuracy of the first stereo camera can be further improved.

Similarly to the above, according to the present embodiment, it is possible to secure a wider interval in the right-left direction between imaging unit 52a and imaging unit 52b constituting the second stereo camera, than that in the one embodiment. Therefore, accuracy of the second stereo camera can be further improved.

(Others)

Figure 16:
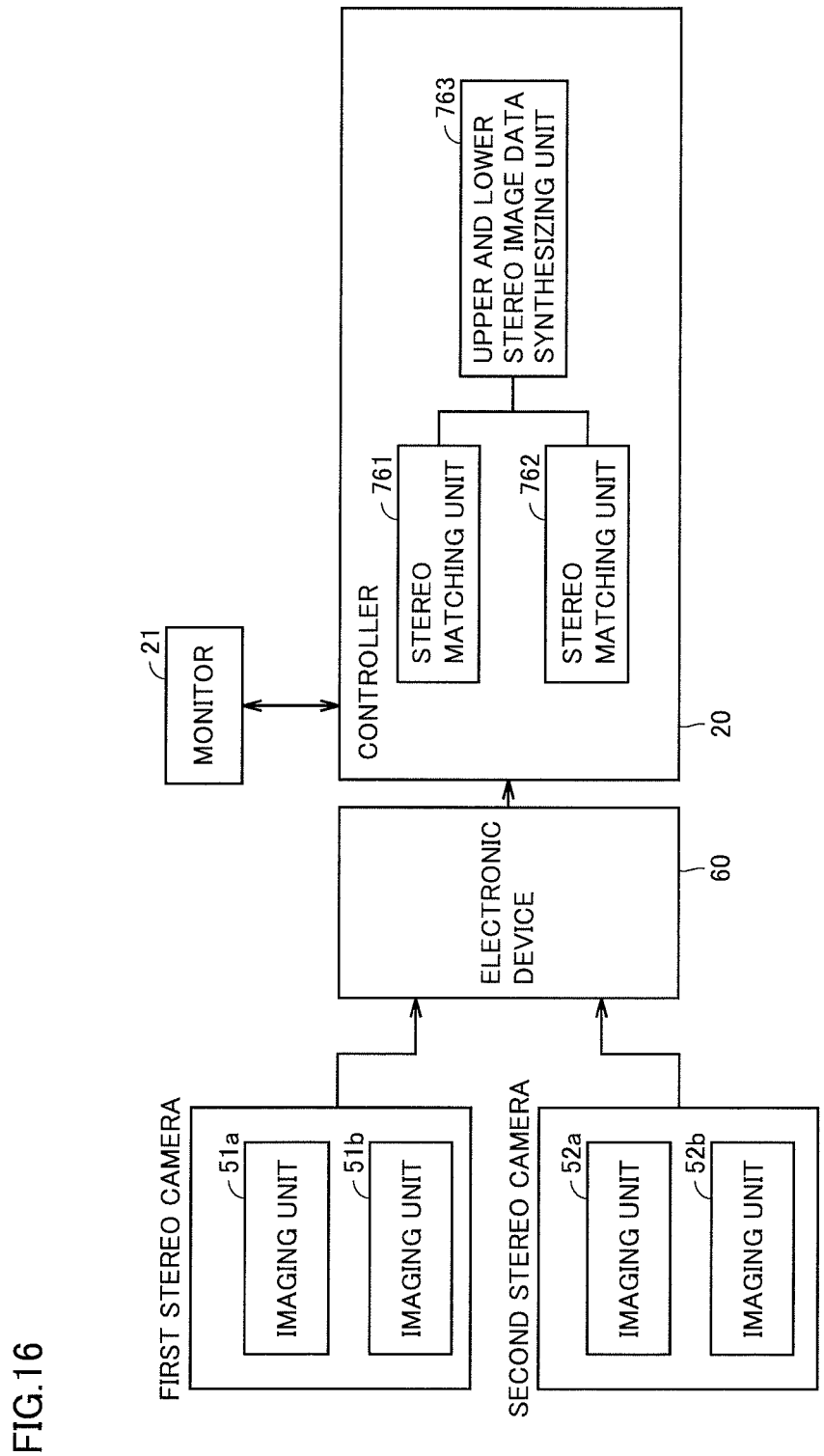
FIG. 16 is a functional block diagram showing another configuration of the stereo image data synthesizing system.

FIG. 16 is a functional block diagram showing another configuration of the stereo image data synthesizing system.

In FIG. 11, the case where monitoring station 76 has stereo matching units 761, 762 and upper and lower stereo image data synthesizing unit 763 has been described. However, as shown in FIG. 16, a controller 20 mounted on a work vehicle such as hydraulic excavator 1 may have stereo matching units 761, 762 and an upper and lower stereo image data synthesizing unit 763. In this case, three-dimensional image data is created by controller 20.

In addition, as shown in FIG. 13, imaging units 51a, 51b, 52a, 52b may be arranged so as to be aligned with two headlamps 91 in front view. Specifically, imaging units 51a, 51b, 52a, 52b may be arranged in an area RC extending from two headlamps 91 to the right and left in the direction where two headlamps 91 are arranged.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: hydraulic excavator (work vehicle), 2: travel unit, 2a: crawler belt, 3: revolving unit, 4: work implement, 4a: boom, 4b: dipper stick, 4c: bucket, 4d, 4e, 4f hydraulic cylinder, 5: cab, 6: engine hood, 7: counterweight, 8: operator's seat, 9: antenna, 20: controller, 21: monitor, 40: front pillar, 40a: first guide rail, 41: left pillar, 42: right pillar, 44: intermediate pillar, 46: rear pillar, 47a: front windshield, 47aa, 47ab: projecting portion, 47b: rear windshield, 48: roof portion, 48a: second guide rail, 49a: front frame, 49b: rear frame, 49ba: through hole, 51a, 51b, 52a, 52b: imaging unit, 53: back plate, 53a: main body portion, 53aa, 53ba, 53ca: female screw portion, 53b: upper fixture, 53c: lateral fixture, 53d: electric wire insertion hole, 54: seal member, 54a: outer peripheral end, 54b, 55ba, 55ca: notch, 55: bracket, 55a: back plate attachment portion, 55b: first support portion, 55bb, 55cb, 55d, 56ab: insertion hole, 55c: second support portion, 56a, 56b: case, 56aa, 56ab, 56ba, 56bb: opening, 57a, 57aa, 57ab, 57b, 57ba, 57bb: glass cover, 58a, 58b, 58c: bolt, 59, 59a, 59b: electric wire, 60: electronic device, 71, 72a, 72b, 73a, 73b: cover, 71a to 71d: cover portion, 76: monitoring station, 81: ceiling interior material, 82: interior material cover, 91: headlamp, 761, 762: stereo matching unit, 763: upper and lower stereo image data synthesizing unit

The invention claimed is:

1. A work vehicle comprising:
a cab;
a first stereo camera having a first imaging unit and a second imaging unit;
a second stereo camera having a third imaging unit and a fourth imaging unit;
a first case accommodating the first imaging unit of the first stereo camera and the third imaging unit of the second stereo camera inside; and
a second case accommodating the second imaging unit of the first stereo camera and the fourth imaging unit of the second stereo camera inside,
wherein the first case and the second case being attached to an outside of the cab.

2. The work vehicle according to claim 1, wherein the first case and the second case are attached to a front frame positioned at an upper front end of the cab.

3. The work vehicle according to claim 1, further comprising an electronic device for processing imaging data obtained by each of the first stereo camera and the second stereo camera,
wherein the electronic device is positioned inside the cab and is attached to a ceiling of the cab.

4. The work vehicle according to claim 3, wherein
the cab has an operator's seat and a front windshield,
the front windshield moves between a closed state and an opened state, is positioned in front of the operator's seat in the closed state, and is positioned above the operator's seat in the opened state, and
the electronic device is positioned above the front windshield in the opened state.

5. The work vehicle according to claim 4, wherein the electronic device is positioned behind the operator's seat.

6. The work vehicle according to claim 3, further comprising an electric wire electrically connecting each of the first stereo camera and the second stereo camera to the electronic device,
wherein
the cab has a rear windshield and a rear frame positioned above the rear windshield, and
the electric wire extends from the outside to an inside of the cab through a through hole provided in the rear frame.

7. The work vehicle according to claim 6, wherein
the electric wire is connected to a front surface of the electronic device, and
the electronic device is inclined such that the front surface is lower and a rear surface opposite to the front surface is higher.

8. The work vehicle according to claim 1, wherein
the first case has a transparent cover in front of the first imaging unit and the third imaging unit, and a height position of an intersection between an optical axis of the first imaging unit and a rear surface of the transparent cover is identical to a height position of an intersection between an optical axis of the third imaging unit and the rear surface of the transparent cover.

9. The work vehicle according to claim 1, further comprising:
a back plate; and
a seal member providing sealing between the back plate and the first case,
wherein at least one of the seal member and the first case is provided with a communicating portion making an inside and an outside of the first case communicate with each other.

10. The work vehicle according to claim 9, further comprising a bracket supported by the back plate,
wherein the bracket has a first support portion supporting the first imaging unit and a second support portion supporting the third imaging unit, and
the bracket is configured such that the first support portion and the second support portion are integrated.

11. The work vehicle according to claim 1, wherein
the cab has a front pillar, and
each of the first imaging unit and the third imaging unit is arranged so as to be superimposed on the front pillar and an extended area of the front pillar in front view.

12. The work vehicle according to claim 11, wherein the first imaging unit is arranged below the third imaging unit.

13. The work vehicle according to claim 12, wherein in a state where the work vehicle is placed on a horizontal ground, a first angle formed by an optical axis of the first imaging unit and a horizontal plane is greater than a second angle formed by an optical axis of the third imaging unit and the horizontal plane.

14. The work vehicle according to claim 1, wherein each of a height position of an upper end of the first case and a height position of an upper end of the second case is lower than a height position of an upper end of the cab.

* * * * *